United States Patent
Davies

(10) Patent No.: US 11,919,249 B2
(45) Date of Patent: Mar. 5, 2024

(54) ROTARY IMPULSE SEALER

(71) Applicant: CONVEYOR LIMITED, Christchurch (NZ)

(72) Inventor: Richard Harry Davies, Christchurch (NZ)

(73) Assignee: CONVEYOR LIMITED, Christchurch (NZ)

( * ) Notice: Subject to any disclaimer, the term of this patent is extended or adjusted under 35 U.S.C. 154(b) by 322 days.

(21) Appl. No.: 16/756,739

(22) PCT Filed: Oct. 16, 2018

(86) PCT No.: PCT/NZ2018/050142
§ 371 (c)(1),
(2) Date: Apr. 16, 2020

(87) PCT Pub. No.: WO2019/078734
PCT Pub. Date: Apr. 25, 2019

(65) Prior Publication Data
US 2021/0178704 A1    Jun. 17, 2021

(30) Foreign Application Priority Data
Oct. 16, 2017   (NZ) ........................................ 736424

(51) Int. Cl.
*B29C 65/38*    (2006.01)
*B29C 65/00*    (2006.01)
(Continued)

(52) U.S. Cl.
CPC ............ *B29C 65/38* (2013.01); *B29C 65/224* (2013.01); *B29C 65/228* (2013.01);
(Continued)

(58) Field of Classification Search
CPC ..... B29C 65/38; B29C 65/224; B29C 65/228; B29C 66/0242; B29C 66/034;
(Continued)

(56) References Cited

U.S. PATENT DOCUMENTS 3,498,019 A    3/1970  Rait
3,748,207 A    7/1973  Campbell et al.
(Continued)

FOREIGN PATENT DOCUMENTS

GB    1278765 A    6/1972
GB    2271753 A  *  4/1994    ............. B65B 51/30
(Continued)

OTHER PUBLICATIONS

International Preliminary Report on Patentability Chapter II for International Patent App. No. PCT/NZ2018/050142, dated Aug. 29, 2019, 38 pages.

(Continued)

*Primary Examiner* — Christopher W Raimund
(74) *Attorney, Agent, or Firm* — Ulmer & Berne LLP

(57) ABSTRACT

A rotary impulse sealer includes a roller having a roller body and a plurality of seal bars extending radially outwardly from the roller and spaced apart around the roller body. At least one of the seal bars has a body and a selectively heatable heating element extending along at least a part of a length of the seal bar body. The roller is rotatable through a pre-heating pressure application region in which the at least one seal bar is adapted to apply pressure to a bond area of the bondable material, followed by a heating region in which the at least one seal bar is adapted to heat the bond area, wherein the at least one seal bar and tensioned belt are configured to sandwich the bondable material directly (Continued)

between the at least one seal bar and tensioned belt during the pre-heating pressure application region and the heating region.

23 Claims, 3 Drawing Sheets

(51) Int. Cl.
  *B29C 65/22* (2006.01)
  *B65B 9/02* (2006.01)
  *B65B 9/12* (2006.01)
(52) U.S. Cl.
  CPC ........ *B29C 66/0242* (2013.01); *B29C 66/034* (2013.01); *B29C 66/1122* (2013.01); *B29C 66/83421* (2013.01); *B65B 9/023* (2013.01); *B65B 9/12* (2013.01)
(58) Field of Classification Search
  CPC ........... B29C 66/1122; B29C 66/83421; B29C 66/0222; B29C 66/0342; B29C 66/83413; B29C 65/225; B29C 66/91421; B29C 66/919; B29C 66/91933; B29C 66/93451; B29C 66/949; B29C 66/8491; B29C 66/81427; B29C 66/81871; B29C 66/83511; B29C 66/71; B29C 66/8122; B29C 66/4312; B29C 66/432; B29C 66/8167; B29C 66/98; B29C 65/221; B65B 9/023; B65B 9/12; B65B 51/306
  See application file for complete search history.

(56) References Cited

U.S. PATENT DOCUMENTS

| 7,247,219 B2 | 7/2007 | O'Dowd |
| 2001/0010142 A1* | 8/2001 | Todd ................... B29C 66/849 |
| | | 53/64 |
| 2005/0022476 A1 | 2/2005 | Hamer et al. |
| 2006/0011291 A1* | 1/2006 | O'Dowd .......... B29C 66/81821 |
| | | 156/583.1 |
| 2007/0180794 A1 | 8/2007 | Paunesku et al. |

FOREIGN PATENT DOCUMENTS

| JP | 2666835 B2 | 5/1997 |
| JP | 2007501172 A | 1/2007 |
| RU | 2170692 C1 | 7/2001 |
| WO | 2019078734 A1 | 4/2019 |

OTHER PUBLICATIONS

International Search Report and Written Opinion for International Patent App. No. PCT/NZ2018/050142, dated Feb. 12, 2019, 14 pages.
Notice of Reasons for Refusal for Japanese Patent App. No. JP2020542523, dated Jul. 26, 2022, 6 pages.

* cited by examiner

ROTARY IMPULSE SEALER

FIELD OF THE INVENTION

The invention relates to a rotary impulse sealer for forming a series of discrete bonds in a bondable material. The invention also relates to a vertical form fill machine. The invention further relates to a method of forming packages for containing fluid or fluent material.

BACKGROUND OF THE INVENTION

Known packages or sachets are made from layers of plastics and/or metallic foils that are laminated together to form a sealed reservoir between adjacent layers for housing the contents of the package.

Such packages are typically manufactured using methods and apparatus similar to those used in the printing industry where elongate webs are passed along a line of stations. Each station performs a different function. Typically, the product to be packaged is introduced between two webs that are sealed together continuously along their opposite edges. The webs are also sealed transversely at intervals to divide the webs into separate components. Individual packages are produced by cutting the webs transversely at the transverse seals.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

New Zealand patent specification NZ 547925 describes a sachet for storing and dispensing a fluent material. The sachet comprises a lamination of first, second and third layers. The second layer is a semi-rigid layer located between the first and third layers. A line of weakness is formed in a mid-portion of the second layer. At least a portion of the line of weakness has inter-digitated finger portions. The sachet is adapted to flex at the line of weakness on application of a compression force at the edges of the second layer. The tips of the inter-digitated finger portions cause the first layer to rupture in the vicinity of the line of weakness to form a discharge opening through which contents of the sachet may be discharged.

U.S. Pat. No. 7,247,219 describes a rotatable cylindrical roller for heat sealing heat sealable materials, in particular for sealing flexible packaging. The rotatable roller has at least one cooling zone and at least one heating zone. Travel of a heat sealable material over the heating zone causes the formation of a heat seal. Travel over the cooling zone allows the seal to cool in a supported state.

When a rotatable cylindrical roller is used to form a transverse web to seal fluent material within a package, there is a risk that the contents of the package will be displaced and/or pressurised within the package by the roller. This has the potential to distribute the contents unevenly within the packages and/or cause poor quality seals.

It is an object of at least preferred embodiments of the present invention to address some of the aforementioned disadvantages. An additional or alternative object is to at least provide the public with a useful choice.

SUMMARY OF THE INVENTION

In accordance with a first aspect of the invention, there is provided a rotary impulse sealer for forming a series of discrete bonds in a bondable material, the rotary impulse sealer comprising: a roller rotatable about an axis, the roller having a roller body and a plurality of seal bars extending radially outwardly from the roller and spaced apart around the roller body, at least one of the seal bars having a body and a selectively heatable heating element extending along at least a part of a length of the seal bar body, wherein the roller is rotatable through a pre-heating pressure application region in which the at least one seal bar is adapted to apply pressure to a bond area of the bondable material, followed by a heating region in which the at least one seal bar is adapted to heat the bond area, the regions being stationary with respect to the rotation of the roller.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

In an embodiment, the roller is rotatable through a post-heating pressure application region in which the at least one seal bar is adapted to apply pressure to the bondable material.

In an embodiment, the pre-heating pressure application region is directly adjacent the heating region.

In an embodiment, the post-heating pressure application region is directly adjacent the heating region.

In an embodiment, the heating region is a heating and pressure application region.

In an embodiment, the body of the seal bar is or comprises an insulating material.

In an embodiment, the heating element extends substantially along the entire length of the seal bar body.

In an embodiment, the heating element is or comprises a conductive material.

In an embodiment, the roller body has a plurality of slots, each slot retaining one of the seal bars.

In an embodiment, at least one seal bar has a longitudinal axis that is substantially parallel to the roller axis.

In an embodiment, at least one seal bar has a longitudinal axis that is non-parallel with the roller axis.

In an embodiment, each seal bar has a body and a selectively heatable heating element extending along at least a part of a length of the seal bar body.

In an embodiment, the roller axis is a stationary axis.

In accordance with a second aspect of the invention, there is provided a vertical form fill machine, comprising: a drive system for driving at least two sheets of bondable material that are sealed together continuously along their opposite edges through the machine; a fill product supply device for introducing fill product between the two sheets of bondable material; and a rotary impulse sealer according to any one of the preceding claims, the rotary impulse sealer adapted to make transverse seals in the at least two sheets of bondable material to form sealed reservoirs of fill product.

In an embodiment, the vertical form fill machine further comprises two cylindrical rollers for receiving sheets of bondable material and forming two continuous, spaced apart longitudinal seals along opposite edges of the sheets of bondable material.

In an embodiment, the cylindrical rollers are arranged to introduce the sheets of bondable material to the rotary impulse sealer at an angle of about 90° to a horizontal plane.

In an embodiment, the rotary impulse sealer is driven so that the seal bar making the seal moves at substantially the same speed as the bondable material that is being sealed.

In accordance with a third aspect of the invention, there is provided a method of forming packages containing fluid or fluent material comprising:

a) continuously providing at least two sheets of bondable material having a fluid or fluent material therebetween;
b) applying pressure to a transverse bond area of the bondable material to force the fluid or fluent material away from the transverse bond area; and
c) heating the transverse bond area to form a seal.

In an embodiment, the method further comprises:

d) applying pressure to the transverse bond area after step c.

In an embodiment, step d comprises allowing heat to dissipate from the transverse bond area.

In an embodiment, step c comprises simultaneously applying pressure and heat to the transverse bond area.

In an embodiment, step c is carried out immediately after step b.

In an embodiment, step d is carried out immediately after step c.

In an embodiment, the transverse bond area extends in a transverse direction across the width of the at least two sheets of bondable material.

In an embodiment, the method further comprises the step of providing a rotary impulse sealer, the rotary impulse sealer comprising a roller rotatable about an axis, the roller having a roller body and a plurality of seal bars extending radially outwardly from the roller and spaced apart around the roller body, at least one of the seal bars having a body and a selectively heatable heating element extending along at least a part of a length of the seal bar body, wherein the roller is rotatable through a pre-heating pressure application region in which the at least one seal bar is adapted to apply pressure to a bond area of the bondable material, followed by a heating region in which the at least one seal bar is adapted to heat the bond area, the regions being stationary with respect to the rotation of the roller; wherein steps b and c are performed by the rotary impulse sealer.

In an embodiment, the rotary impulse sealer performs step d.

In an embodiment, step c comprises selectively applying a current to the heating element of the seal bar.

In accordance with a fourth aspect of the invention, there is provided a package containing fluid or fluent material produced by the method of the third aspect.

In accordance with an aspect of the disclosure, there is provided a rotary impulse paddle sealer for forming a discontinuous bond in a bondable material, comprises a roller rotatable about an axis; a plurality of seal bars extending radially outwardly from the roller and spaced apart around the roller, at least one of the seal bars adapted to be selectively excited by a current during a portion of the rotation of the roller to temporarily heat the at least one seal bar, the at least one seal bar adapted to apply pressure to an area of material to be bonded during a portion of the rotation immediately preceding the portion of the rotation in which the at least one seal bar is heated.

In an embodiment each seal bar is adapted to apply pressure during a portion of the rotation immediately following the portion of the rotation in which the seal bar is heated.

In an embodiment the at least one seal bar comprises a seal bar body and a heating element extending along at least a part of a length of the seal bar body.

In an embodiment the heating element extends substantially along the entire length of the seal bar body.

In an embodiment the roller is provided with a plurality of slots adapted to retain respective seal bars, the slots shaped such that the seal bars extend radially from the roller.

In an embodiment at least one of the slots is substantially parallel to the axis about which the roller is rotatable.

In an embodiment at least one of the slots is positioned such that it is not parallel to the axis about which the roller is rotatable.

In an embodiment at least one of the slots is shaped such that it is not parallel to the axis about which the roller is rotatable.

In accordance with a further aspect of the invention, a vertical form fill machine comprises a drive system for driving at least two sheets of bondable material that are sealed together continuously along their opposite edges through the machine; a fill product supply device for introducing fill product between the two sheets of bondable material; a rotary impulse paddle sealer for forming sealed reservoirs of fill product, the rotary impulse paddle sealer adapted to apply pressure to an area to be bonded during a portion of the rotation immediately preceding a portion of the rotation in which the rotary impulse paddle sealer applies heat to form a bond.

In an embodiment the rotary impulse paddle sealer is adapted to apply pressure during a portion of the rotation immediately following the portion of the rotation in which the rotary impulse paddle sealer applies heat to form a bond.

In an embodiment the rotary impulse paddle sealer is adapted to receive sheets of bondable material containing fill material at an angle greater than 0° to a horizontal plane.

In an embodiment the rotary impulse paddle sealer is driven at substantially the same speed as the bondable material that is being sealed.

In accordance with a further aspect of the invention, a method of forming packages of fluid or fluent material comprises providing a drive system adapted to drive at least two sheets of bondable material; sealing a first edge and a second edge of the sheets of bondable material together continuously; introducing a fluent material between the two sheets of bondable material; providing a rotary impulse paddle sealer adapted to apply pressure to an area to be bonded during a portion of the rotation immediately preceding a portion of the rotation in which the rotary impulse paddle sealer applies heat to form a bond.

The invention in one aspect comprises several steps. The relation of one or more of such steps with respect to each of the others, the apparatus embodying features of construction, and combinations of elements and arrangement of parts that are adapted to affect such steps, are all exemplified in the following detailed disclosure.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

Preferred forms of the rotary impulse paddle sealer will now be described by way of example only with reference to the accompanying figures in which.

DETAILED DESCRIPTION

Figure 1:
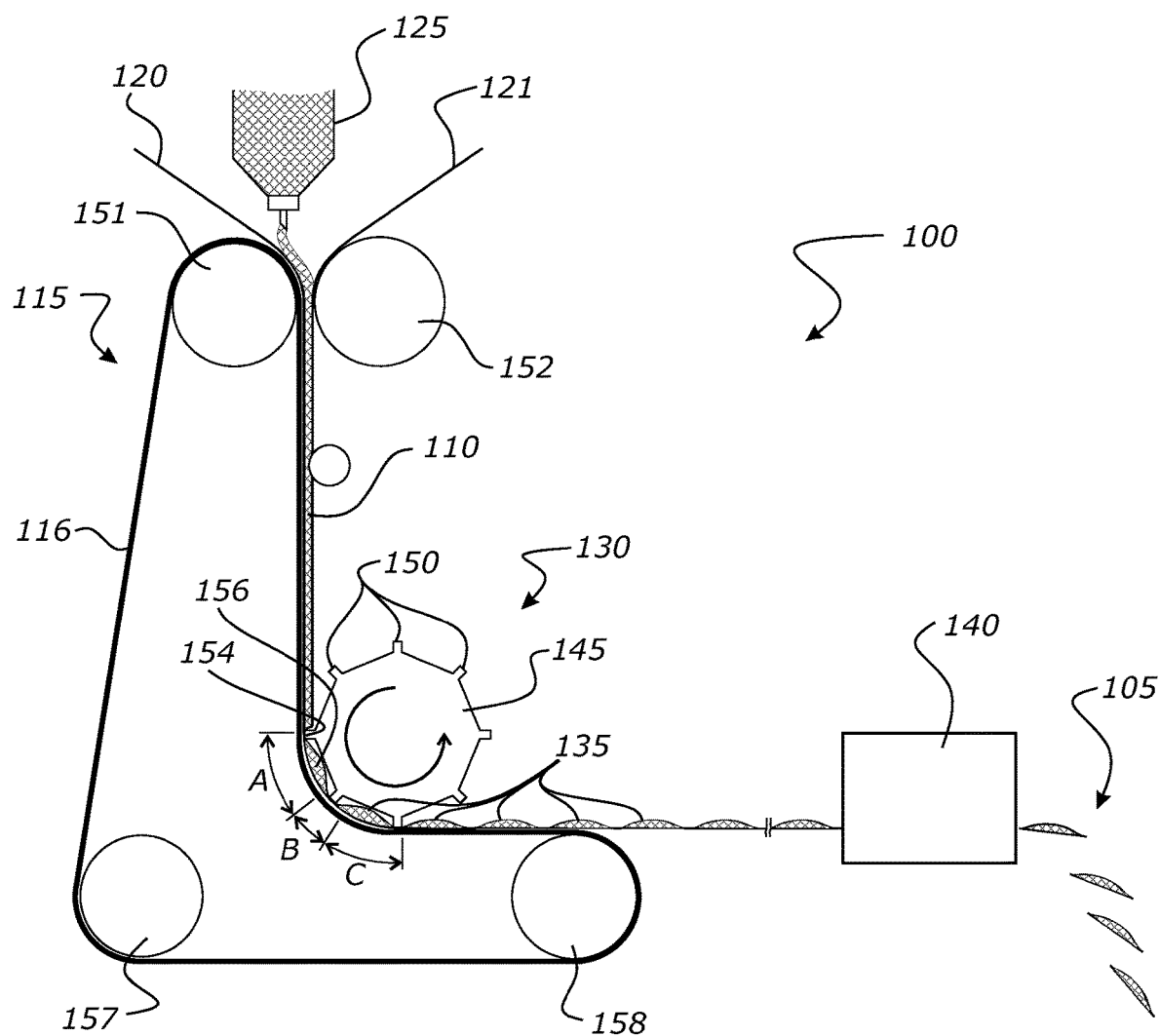
FIG. 1 shows a schematic of a vertical form fill machine including a rotary impulse paddle sealer.

FIG. 1 shows a schematic of a continuous vertical form fill machine 100 for manufacturing packages 105 of fluid or fluent fill product 110. The vertical form fill machine 100 includes a drive system 115 for driving at least two sheets of bondable material 120, 121 that are sealed together continuously along their opposite edges though the machine 100. The drive system operates continuously. The vertical form fill machine 100 also has a fill product supply device 125 for introducing fill product 110 between the two sheets of bondable material 120, 12. The vertical form fill machine 100 also has a rotary impulse sealer 130. The rotary impulse sealer 130 is adapted to make transverse seals in the at least two sheets of bondable material for forming sealed reservoirs 135 of fill product 110. The vertical form fill machine also has a cutting station 140 for separating the sealed reservoirs 135 into individual packages 105.

The vertical form fill machine 100 is suitable for packaging fluid or fluent material or product, such as liquids or flowable powders. The size of the machine and/or components of the machine can be adapted to make packages of any size. In an embodiment, the machine 100 is adapted to produce packages having a volume of about 2 mL or about 5 mL. In another embodiment, the machine 100 is adapted to produce packages having a volume of about 1 L or more. The machine 100 may be adapted to produce packages having any other suitable volume, for example about 10 mL, about 20 mL, about 50 mL, about 75 mL, about 100 mL, about 200 mL, about 500 mL, about 750 mL or about 2 L.

Fluid or fluent materials include liquids, creams, lotions, gels, pastes, powders, lubricated powders, particulates, sauces, beverages, sunscreens, lubricants, paints, greases, oils, glues, resins, medicines, pharmaceuticals, etc.

The rotary impulse sealer 130 forms a series of discrete bonds in a bondable material 120, 121. The rotary impulse sealer 130 has a roller 145 rotatable about an axis. In the embodiment shown, the roller axis is a stationary axis. The roller 145 has a roller body 155 and a plurality of seal bars 150. The seal bars 150 extend radially outwardly from the roller 145 and are spaced apart around the roller body 155. In the embodiment shown, the seal bars 150 extend axially along substantially the entire axial length of the roller 145.

At least one of the seal bars 150 has a body 175 and a selectively heatable heating element 180 extending along at least a part of a length of the seal bar body 175. In the embodiment shown, each seal bar 150 has a body 175 and a selectively heatable heating element 180 extending along at least a part of a length of the seal bar body 175.

The roller 145 is rotatable through a pre-heating pressure application region or rotation portion A in which the at least one seal bar 150 is adapted to apply pressure to a bond area 154 of the bondable material 120, 121. The pre-heating pressure application region A is followed by a heating region or rotation portion B in which the at least one seal bar 150 is adapted to heat the bond area 154. The pre-heating pressure application region A and the heating region B are stationary with respect to the rotation of the roller 145.

In the embodiment shown, the roller 145 is rotatable through a post-heating pressure application region or rotation portion C in which the at least one seal bar 150 is adapted to apply pressure to the bondable material. The post-heating pressure application region C is stationary with respect to the rotation of the roller 145. In an alternative embodiment, the rotary impulse sealer 130 may not have a post-heating pressure application region C and the roller may only rotate through the pre-heating pressure application region is followed by the heating region B.

The rotary impulse sealer 130 may be referred to as a rotary impulse paddle sealer 130. The 'paddles' of the rotary impulse paddle sealer are the seal bars 150. The seal bars 150 act as paddles to drive fill product away from a bond area, as will be described in more detail below.

The heating element 180 is adapted to be heated by selectively applying a current to the heating element 180 during the heating region B of the rotation of the rotary impulse paddle sealer 130. In an embodiment, the heating element 180 of each seal bar 150 is adapted to be heated by selectively applying a current to the heating element 180. The selectively applied current may be described as an impulse current.

In the preferred embodiment, two sheets of bondable material 120, 121 are sealed together continuously along their opposite edges to form two substantially parallel longitudinal webs. The bondable material may be polyethylene, or any other heat sealable or bondable material. The longitudinal webs may be formed by any suitable process, such as a conventional continuous heat sealing process. In the embodiment shown, the sheets of bondable material 120, 121 are received between two cylindrical rollers 151, 152. One of the cylindrical rollers 152 has heated portions at either end (not illustrated) that apply heat to the edges of the sheets of bondable material 120, 121 to form the longitudinal webs. The cylindrical rollers 151, 152 form two continuous, spaced apart longitudinal seals along opposite edges of the sheets of bondable material 120, 121. Fill product 110 is introduced between the longitudinal webs.

In an alternative embodiment, a sheet of bondable material is folded in half, and a single longitudinal web is formed at the open edges of the sheet. Fill product 110 is introduced between the longitudinal web and the fold. In a further alternative embodiment, fill product 110 is introduce into a tube of bondable material. The tube of bondable material may not have any longitudinal webs.

The drive system 115 includes a belt 116 that drives the bondable material 120, 121 toward the rotary impulse paddle sealer 130 at a substantially constant speed. The belt is held under tension by the cylindrical roller 151, and two belt (lower) rollers 157, 158 in combination with the rotary impulse sealer 130. One or more of the rollers 151, 157, 158 may be a driving roller that drives the belt 116. The sheets 120, 121 are introduced to the rotary impulse paddle sealer 130 by the drive system 115.

In the embodiment shown in FIG. 1, the belt rollers 157, 158 are located below the cylindrical roller 151. The belt rollers 157, 158 are located at substantially the same height. The drive system 115 has a substantially L-shaped arrangement, with the rotary impulse sealer 130 located at the bend of the L. This arrangement provides a relatively large portion of the rotation of the rotary impulse sealer 130 in which a seal bar 150 is in contact with the bondable material 120, 121.

Figure 4:
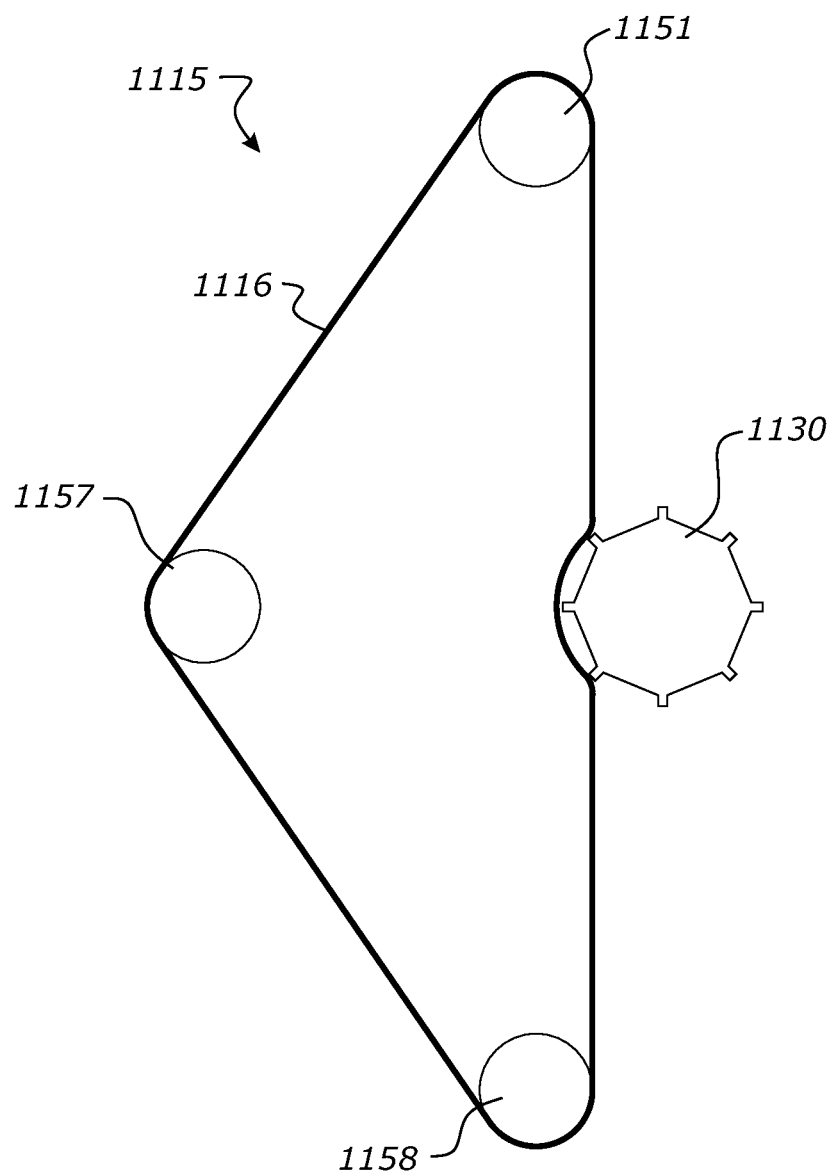
FIG. 4 shows an alternative arrangement of a drive system for a vertical form fill machine.

FIG. 4 shows an alternative arrangement of a drive system 1115. The drive system 1115 is the same as the drive system 115, except as described below. Like parts indicate like numbers, with the addition of 1000. In this embodiment, one of the belt rollers 1158 is located below the cylindrical roller 1151, substantially in line with the cylindrical roller 1151, such that the rotary impulse sealer 1130 acts on a substantially vertical belt surface. This arrangement provides a relatively short portion of the rotation of the rotary impulse sealer in which a seal bar 1150 is in contact with the bondable material 1120, 1121. This arrangement may be suitable for applications in which a short sealing time is required, and may enable packages to be formed very quickly.

In other embodiments, the relative position of the belt rollers may be chosen or designed depending on the required sealing time. For example, belt rollers may be positioned such that the belt has a U-shaped, or V-shaped configuration. In such a configuration, the sealing time may be increased compared to the sealing time of the illustrated embodiments because the belt will travel around the roller for a greater amount of time.

In the embodiments shown in FIG. 1 and FIG. 4, the cylindrical rollers 151, 152 are arranged to introduce the sheets of bondable material 120, 121 to the rotary impulse sealer 130 at a substantially vertical orientation (about 90° relative to a horizontal plane). In alternative embodiments, the sheets of bondable material 120, 121 are introduced at any angle that enables the fill product to fall towards the rotary impulse paddle sealer 150 under the force of gravity. In an embodiment the angle is greater than 0° to a horizontal plane. In an embodiment the angle is less than 90° to a horizontal plane. For example, the sheets of bondable material 120, 121 may be introduced at an angle of about 85°, about 80°, about 70°, about 60°, about 45°, about 30° or about 15° to a horizontal plane.

In an embodiment, at least one of the sheets of bondable material 120, 121 is modified prior to being sealed to the other sheet of bondable material 120, 121. For example by adding registration markers to facilitate timing of machine operations. In an embodiment, a cut and/or other line of weakness is introduced to one of the sheets of bondable material 120, 121 to facilitate controlled rupture of at least one of the package 105 layers prior to dispensing the package 105 contents. The line of weakness may have a zig-zag shape. Exemplary package arrangements are disclosed in NZ 547925, which is incorporated herein by reference.

When a seal bar 150 first contacts the bondable material 120, 121, the seal bar 150 applies pressure to the bondable material 120, 121 through the pre-heating pressure application region A of the rotation of the roller 145. The seal bar 150 applies pressure in a generally transverse direction across the width of the at least two sheets of bondable material 120, 121. The pressure from the seal bar 150 forces the fill product 110 away from a bond area 154. The pressure from the seal bar 150 defines a fill volume 156 between the seal bar 150 and an adjacent seal bar 150 further around the rotation path.

The bond area 154 extends in a transverse direction across the width of the at least two sheets of bondable material 120, 121. The bond area 154 extends an angle of about 90° to the longitudinal webs. In alternative embodiments, the bond area 154 may extend between the longitudinal webs 154 at any suitable angle, for example about 75°, about 80°, about 85°, about 95°, about 100° or about 105°.

An impulse current is then applied to the heating element 180 of the seal bar 150 during the heating region B of the rotation of the roller 145 to heat the seal bar 150. The heat from the seal bar 150 forms a bonded transverse web in the bondable material 120, 121. In the embodiment shown, the pre-heating pressure application region A is directly adjacent the heating region B.

In other words, the pre-heating pressure application region A in which the seal bar 150 applies pressure to an area of material to be bonded immediately precedes the heating region B in which the seal bar 150 is heated to form a bond.

In an alternative embodiment, there may be a space between the pre-heating pressure application region A and the heating region B.

In an embodiment, the heating region B is a heating and pressure application region. In a preferred embodiment, more pressure is applied during the heating region B than during the pre-heating pressure application region A. In an alternative embodiment, less pressure is applied during the heating region B than during the pre-heating pressure application region A.

After the impulse current is switched off, the bond cools under pressure from the seal bar 150 during the post-heating pressure application region C of the rotation of the roller 145. In the embodiment shown, the post-heating pressure application region C is directly adjacent the heating region B.

In other words, the post-heating pressure application region C in which the bond cools under pressure from the seal bar 150 immediately follows the heating region B in which the seal bar 150 is heated to form a bond.

In an alternative embodiment, the post-heating application may not be immediately followed by the heating region. For example, there may be another step or process between the heating region B and the post-heating pressure application region C.

In an embodiment, the heating element is formed from a material that rapidly cools so that the bondable material cools to a temperature below the melting point of the bondable material when the current is no longer applied. This allows heat to dissipate in the post-heating pressure application region C. Heat may dissipate in a variety of different ways. For example, the heat may dissipate into the fill product 110, the bondable material 120, 121, and the surrounding environment.

In an embodiment, the seal bars 150 include a cooling system, such as a water cooling system, to assist with heat dissipation.

Applying pressure with the seal bar 150 prior to heating the bondable material 120, 121 removes fill product 110 from the area to be bonded prior to the bond being formed. This ensures a high quality bond that is free, or at least substantially free, from particles of fill product 110. Allowing the bond to cool while still under pressure from the seal bar 150 ensures the bond sets correctly and further contributes to a high quality seal.

Arranging the rotary impulse paddle sealer 130 below the vertical or angled fill product 110 as shown in FIG. 1 allows packages of liquid to be formed that have no air gaps, or at least substantially no air gaps. This is advantageous in certain applications, for example when packaging food, an absence of air gaps can improve food longevity.

Figure 2:
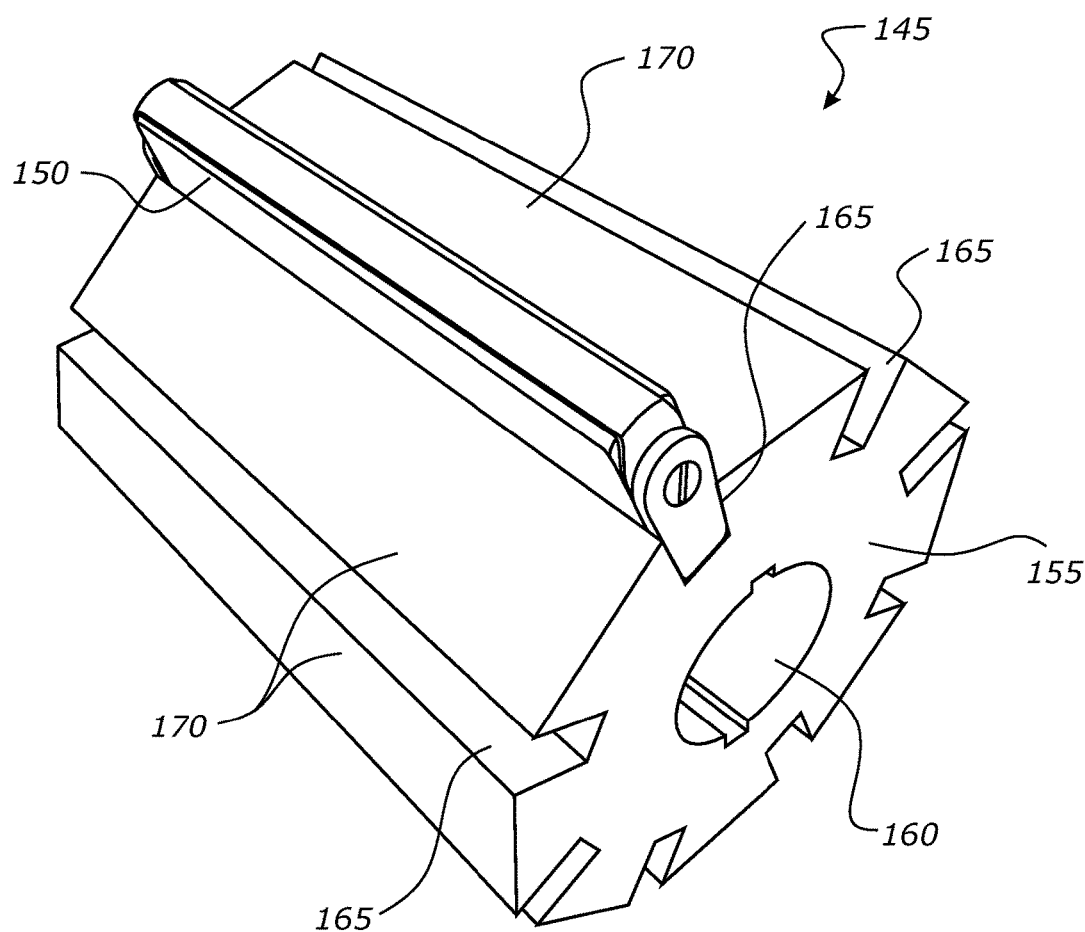
FIG. 2 shows an exemplary rotary impulse paddle sealer roller.

FIG. 2 shows a perspective view of an exemplary roller 145. The roller comprises a roller body 155. The roller body 155 is electrically insulated from the seal bars 150. In an embodiment the roller body 155 is made from an insulating material, for example a polymeric material such as high density polyethylene. In an alternative embodiment the roller body 155 is at least partially coated in an insulating material. The roller body 155 has an aperture 160 for receiving an axle (not shown), and a plurality of slots 165, each slot 165 retaining one of the seal bars 150. One seal bar 150 is shown mounted in a slot 165.

In an embodiment the slots 165 are slightly narrower than the seal bars 150 so that the seals bars 150 can be retained in the slots 165 in a press fit. In an embodiment, the slots 165 include electrodes for contacting the electrodes 185, 186 of the seal bars 150. The electrodes are made from tin coated copper, or any other suitably conductive material.

The axle of the roller 145 is driven, for example by a servo motor. In an embodiment, a control system adjusts the speed of rotation of the roller 145 to ensure the transverse webs are correctly aligned with registration markers on the bondable material.

Driving the roller 145 rotation ensures that the seal bar 150 making the seal is moving at substantially the same speed as the bondable material 120, 121 that is being sealed. This ensures a high quality seal is formed. If the roller 145 was not driven and was instead free rolling, the seal bars 150 could slip relative to the bondable material 120, 121, leading to a poor quality seal. In addition, it would not be possible to accurately align the transverse webs using a control system.

The seal bars 150 extend outwardly from the roller 145 to define a gap that accommodates the individual reservoirs 135 of fill product 110. In the embodiment shown, the gap is defined by substantially flat portions 170 of the roller 145 that extend between the seal bars 150.

In alternative embodiments, the roller 145 could be any other suitable shape that accommodates the individual reservoirs 135 of fill product 110. For example, the portions 170 of the roller 145 extending between the seal bars 150 could have a convex shape or a concave shape.

The spacing between the outer surfaces of the seal bars 150 determines the longitudinal dimension of the package 105 volume. In the embodiment shown, the rotary impulse paddle sealer 130 has eight seal bars 150 spaced about 40 mm apart from each other in a radial direction.

In alternative embodiments, any suitable number of seal bars having any suitable spacing may be used to achieve the desired package dimensions. In the embodiment shown, the seal bars 150 are equally spaced around the roller 145. At least one of the seal bars 150 has a longitudinal axis that is substantially parallel to the roller axis. In the embodiment shown, all of the seal bars 150 have a longitudinal axis that is substantially parallel to the roller axis. The seal bar 150 arrangement shown in the figures produces packages that have a transverse web that is substantially perpendicular to the longitudinal webs.

In an alternative embodiment, the seal bars 150 are not equally spaced.

In an alternative embodiment, at least one of the seal bars has a longitudinal axis that is non-parallel with the roller axis. This can be achieved, for example, by providing at least one slot that is positioned such that it is not parallel to the axis about which the roller is rotatable. In an embodiment, the seal bars 150 are angled so that they form transverse webs that are not perpendicular to the longitudinal webs.

In an alternative embodiment, the seal bars are adapted to form a shaped transverse web. For example, the seals bars could be shaped to form a transverse web having a curved shape. This can be achieved, for example, by providing at least one slot that is shaped such that it is not parallel to the axis about which the roller is rotatable.

Figure 3:
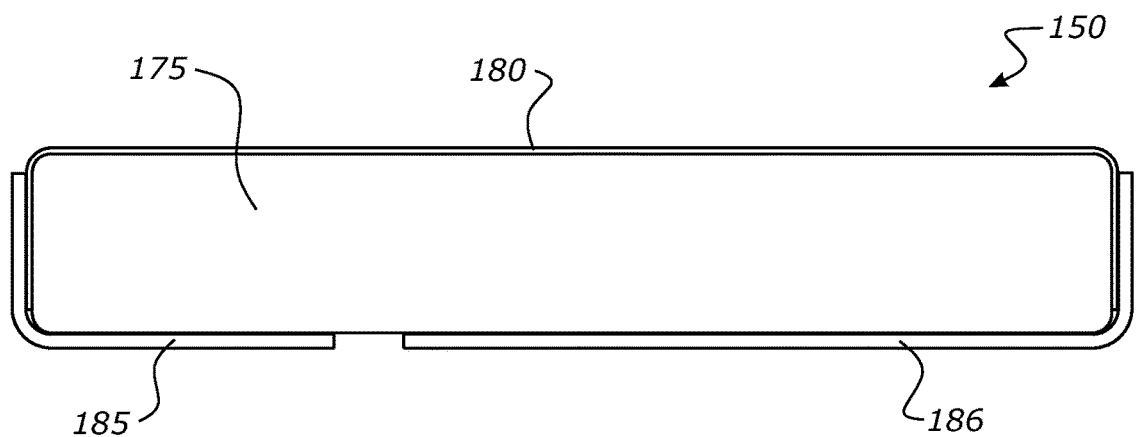
FIG. 3 shows an exemplary rotary impulse paddle sealer seal bar.

FIG. 3 shows an exemplary seal bar 150. The seal bar 150 comprises a seal bar body 175, a heating element 180 and electrodes 185, 186.

The seal bar body 175 is adapted to slot into a slot 165 of the roller 145. The seal bars 150 are mounted in the slots 165 using any suitable method. In the embodiment shown, the seal bar body 175 has a substantially rectangular cross section that is press fit in a slot 165 of the roller 145. In alternative embodiments, the seal bar body 175 and roller slots 165 are shaped so that the seal bar body 175 is retained when the seal bar 150 is slid into a slot 165 in an axial direction.

The seal bar body 175 is or comprises an insulating material. The seal bar body 175 is made from a suitably strong material that can withstand both pressure applied by the seal bar 150 to the bondable material 120, 121 and heat from the heating element 180. In an embodiment, the seal bar body 175 is formed from polyetheretherketone (PEEK). In an alternative embodiment, the seal bar body 175 is formed from a conductive material such as aluminium alloy that is at least partially coated in an insulating material. In a further alternative embodiment, the seal bar body 175 is or comprises a ceramic material.

The heating element 180 extends substantially along the entire length of the seal bar body 175 and folds over the ends of the seal bar body 175. The heating element 180 is or comprises a conductive material. In an exemplary embodiment, the heating element 180 is made from a nickel chromium alloy. For example, the heating element 180 may be made from a nickel chromium alloy comprising about 60% nickel, about 16% chromium, and about 24% iron. The heating element may be made from any other suitable heating element material. In the embodiment shown in the figures, the heating element 180 extends substantially along the entire length of the seal bar body 175.

In the alternative embodiment where the seal bar body 175 is or comprises a ceramic material, the heating element 180 may comprise a thin layer of conductive material, such as a layer of conductive particles. The particles may be in the form of a sand. The conductive particles may be a metal. The thin layer of conductive material may be embedded in the seal bar body 175. The thin layer of conductive material may be coated in a thin layer of ceramic glass.

The electrodes 185, 186 overlap with the heating element 180 at the ends of the seal bar body 175 and enable current to be applied to the heating element 180. The electrodes are made from tin coated copper, or any other suitably conductive material. Current may be applied to the electrodes via slip rings or any other suitable means.

A method of forming packages containing fluid or fluent material will now be described. The method comprises step a, which is to continuously provide at least two sheets of bondable material 120, 121 having the fluid or fluent material 110 therebetween. When the two sheets of bondable material 120, 121 reach the sealer, the next step, step b, comprises applying pressure to the transverse bond area 154 of the bondable material 120, 121. Applying pressure to the transverse bond area 154 forces the fluid or fluent material 110 away from the bond area.

A subsequent step, step c, comprises heating the transverse bond area 154 to form a seal. In the preferred method, step c comprises simultaneously applying pressure and heat to the transverse bond area.

Step c comprises selectively applying a current to the heating element 180 of the seal bar 150 (in other words, applying an impulse current). The seal bar 150 has electrodes 185, 186 that overlap with the heating element 180 at the ends of the seal bar body 175. The impulse current is applied to the seal bar electrodes 185, 186 via electrodes mounted in the slots 165 of the roller 145. The electrodes 185, 186 are in electrical communication with slip ring that is electrically charged during a portion of the rotation of the roller 145 corresponding to the heating region B to selectively apply a current to the heating element 180. In an alternative embodiment, the impulse current may be applied directly to the seal bar electrodes 185, 186.

The power applied during the impulse is variable depending on the application. In an exemplary embodiment, about 10V, 80 A is applied for about 150-250 milliseconds. The power applied and/or the duration of the impulse may be varied depending on the thickness and material properties of the bondable material. For example, an impulse duration of about 50 ms may be sufficient to provide a good bond in some applications. In alternative embodiments, any suitable impulse duration may be used, such as about 60 ms, about 80 ms, about 100 ms, 1 about 20 ms, about 200 ms, or about 300 ms.

The heating element 180 is heated to about 300° C. when the impulse current is applied. In other embodiments, the heating element is heated to any other suitable temperature, such as about 200° C., about 220° C., about 250° C., about 270° C., about 290° C., about 310° C., about 330° C. or about 350° C., for example. The temperature of the heating element may be selected depending on the properties of the sheets of bondable material 120, 121. The temperature of the heating element 180 may be significantly higher than a melting temperature of the bondable material. For example, the temperature of the heating element 180 may be about twice the melting temperature of the bondable material. The relatively high temperature of the heating element 180 enables sufficient heat penetration of the bond area to create a seal during the relatively short duration of the impulse. A higher temperature of the heating element 180 may be used where the sheets of bondable material 120, 121 are thicker.

In the preferred embodiment, the method further comprises step d, which comprises applying pressure to the transverse bond area 154 after the step of heating the transverse bond area. This step occurs during the post-heating pressure application region C of the rotation of the roller. Applying pressure after heating step c may help the bond to set correctly. In an alternative embodiment, the method may not include step d.

Either during, or before step d, heat is no longer applied to the transverse bond area. The heat is no longer applied by the impulse current ceasing. Accordingly, during step d, the heat from the transverse bond area is allowed to dissipate from the transverse bond area. For example, heat may dissipate into the fluid or fluent material 110, the bondable material 120, 121, and the surrounding environment.

The heating element 180 cools to less than 120° C. as the heat dissipates. The heating element 180 may cool to any suitable temperature, depending on the material that is being bonded. For example, the heating element may cool to about 60° C., about 80° C., about 100° C., about 140° C. or about 160° C.

Step d is preferably carried out immediately after step c. In an alternative embodiment, there may be a gap between carrying out step c and step d.

In the preferred method, pressure is applied continuously throughout steps b, c, and d. In an embodiment, the amount of pressure applied increases during step b and reaches a maximum during step c. The amount of pressure applied then decreases during step d. In an alternative embodiment, the amount of pressure may be applied relatively constant throughout a substantial part of steps b, c and d. In alternative embodiments, step c may comprise applying the same amount of pressure as step b, or less pressure than step b. In a preferred embodiment, step c comprises applying more pressure than step b. In alternative embodiments, step c comprises applying the same amount of pressure as step d, or less pressure than step d.

The method is preferably carried out using the rotary impulse sealer 130. In the preferred method, the rotary impulse sealer 130 performs steps b, c, and d. In an alternative embodiment, the rotary impulse sealer 130 may perform steps b and c, and not step d. Step b corresponds to the pre-heating pressure application region A of the roller. Step c corresponds to the heating region B of the roller. Step d corresponds to the post-heating pressure application region C of the roller.

In an exemplary embodiment, pressure is applied during the pre-heating pressure application region A for about 400 milliseconds. Pressure may be applied during the pre-heating pressure application region A for any suitable period of time. The optimum amount of time may be different for different fluid or fluent materials. For example, pressure may be applied for about 50 milliseconds, about 60 milliseconds, about 80 milliseconds, about 100 milliseconds, about 150 milliseconds, about 200 milliseconds, about 250 milliseconds, about 300 milliseconds, about 350 milliseconds, about 450 milliseconds, about 500 milliseconds, about 550 milliseconds or about 600 milliseconds.

In an exemplary embodiment, pressure is applied during the post-heating pressure application region C for about 400 milliseconds. Pressure may be applied during the post-heating pressure application region C for any suitable period of time. The optimum amount of time may be different for different materials. For example, pressure may be applied for about 50 milliseconds, about 60 milliseconds, about 80 milliseconds, about 100 milliseconds, about 150 milliseconds, about 200 milliseconds, about 250 milliseconds, about 300 milliseconds, about 350 milliseconds, about 450 milliseconds, about 500 milliseconds, about 550 milliseconds or about 600 milliseconds.

The rotation speed of the roller 145 and/or the timing and location of the impulse current is/are controlled by a control system. In an exemplary embodiment, the impulse current is applied at a point of the rotation of the roller 145 corresponding to the start of the heating region B. In an exemplary embodiment, the impulse current is applied during a portion of the rotation of the rotary impulse paddle sealer 130 in which maximum pressure is applied to the bondable material 120, 121 by the seal bar 150. The location and length of the portion of the rotation where the impulse current is applied is adjustable via the control system. For example, a single rotation of the roller 145 is divided into a number of counts. A sensor associated with the axle of the roller 145 determines a nominal starting point for the rotation. The control system applies current to each seal bar 150 at a different number of counts such that current is initially applied to each seal bar 150 at a point of the rotation of the roller 145 corresponding to the start of the heating region B. Current is applied to each seal bar 150 for a duration of time set by a user.

Preferred embodiments of the invention have been described by way of example only and modifications may be made thereto without departing from the scope of the invention.

The invention claimed is:

1. A rotary impulse sealer for forming a series of discrete bonds in a bondable material, the rotary impulse sealer comprising:
   a roller rotatable about an axis, the roller having a roller body and a plurality of seal bars extending radially outwardly from the roller and spaced apart around the roller body, at least one of the seal bars having a body and a selectively heatable heating element extending along at least a part of a length of the seal bar body;
   a tensioned belt for introducing the bondable material to the roller;
   wherein the roller is rotatable through a pre-heating pressure application region of the rotary impulse sealer in which the at least one seal bar is adapted to apply pressure to a bond area of the bondable material, followed by a heating region of the rotary impulse sealer in which the at least one seal bar is adapted to heat the bond area and apply more pressure in the heating region than the pressure applied during the pre-heating pressure application region, the regions being stationary with respect to the rotation of the roller;
   wherein the speed of rotation of the roller is adjustable relative to the bondable material such that the at least one seal bar moves at substantially the same speed as the bondable material while the seal bar applies pressure to the bond area.

2. The rotary impulse sealer according to claim 1, wherein the roller is rotatable through a post-heating pressure application region of the rotary impulse sealer in which the at least one seal bar is adapted to apply pressure to the bondable material.

3. The rotary impulse sealer according to claim 1, wherein the pre-heating pressure application region is directly adjacent the heating region.

4. The rotary impulse sealer according to claim 2, wherein the post-heating pressure application region is directly adjacent the heating region.

5. The rotary impulse sealer according to claim 1, wherein the heating region is a heating and pressure application region.

6. The rotary impulse sealer according to claim 1, wherein the body of the seal bar is or comprises an insulating material.

7. The rotary impulse sealer according to claim 1, wherein the heating element extends substantially along the entire length of the seal bar body.

8. The rotary impulse sealer according to claim 1, wherein the heating element is or comprises a conductive material.

9. The rotary impulse sealer according to claim 1, wherein the roller body has a plurality of slots, each slot retaining one of the seal bars.

10. The rotary impulse sealer according to claim 1, wherein at least one seal bar has a longitudinal axis that is substantially parallel to the roller axis.

11. The rotary impulse sealer according to claim 1, wherein at least one seal bar has a longitudinal axis that is non-parallel with the roller axis.

12. The rotary impulse sealer according to claim 1, wherein each seal bar has a body and a selectively heatable heating element extending along at least a part of a length of the seal bar body.

13. The rotary impulse sealer according to claim 1, wherein the roller axis is a stationary axis.

14. A vertical form fill machine, comprising:
   a drive system for driving at least two sheets of bondable material that are sealed together continuously along their opposite edges through the machine;
   a fill product supply device for introducing fill product between the two sheets of bondable material; and
   a rotary impulse sealer according to claim 1, the rotary impulse sealer adapted to make transverse seals in the at least two sheets of bondable material to form sealed reservoirs of fill product.

15. The vertical form fill machine according to claim 14, further comprising two cylindrical rollers for receiving sheets of bondable material and forming two continuous, spaced apart longitudinal seals along opposite edges of the sheets of bondable material.

16. The vertical form fill machine according to claim 15, wherein the cylindrical rollers are arranged to introduce the sheets of bondable material to the rotary impulse sealer at an angle of about 90° to a horizontal plane.

17. The vertical form fill machine according to claim 14, wherein the rotary impulse sealer is driven so that the seal bar making the seal moves at substantially the same speed as the bondable material that is being sealed.

18. A method of forming a series of discrete bonds in a bondable material, the method comprising:
   rotating a roller of a rotary impulse sealer about an axis, the roller having a roller body and a plurality of seal bars extending radially outwardly from the roller and spaced apart around the roller body, at least one of the seal bars having a body and a selectively heatable heating element extending along at least a part of a length of the seal bar body;
   introducing a bondable material to the roller using a tensioned belt of the rotary impulse sealer;
   rotating the roller through a pre-heating pressure application region of the rotary impulse sealer in which the at least one seal bar applies pressure to a bond area of the bondable material, followed by a heating region of the rotary impulse sealer in which the at least one seal bar heats the bond area and applies more pressure in the heating region than the pressure applied during the pre-heating pressure application region, the regions being stationary with respect to the rotation of the roller; and
   adjusting the speed of rotation of the roller relative to the bondable material such that the at least one seal bar moves at substantially the same speed as the bondable material while the seal bar applies pressure to the bond area.

19. The method according to claim 18, further comprising rotating the roller through a post-heating pressure application region of the rotary impulse sealer in which the at least one seal bar applies pressure to the bondable material.

20. The method according to claim 18, wherein the pre-heating pressure application region of the rotary impulse sealer is directly adjacent the heating region of the rotary impulse sealer.

21. The method according to claim 19, wherein the post-heating pressure application region of the rotary impulse sealer is directly adjacent the heating region of the rotary impulse sealer.

22. The method according to claim 18, wherein the heating region of the rotary impulse sealer is a heating and pressure application region of the rotary impulse sealer.

23. The method according to claim 18, wherein the body of the seal bar is or comprises an insulating material.

* * * * *